United States Patent
Hu et al.

(10) Patent No.: US 8,087,085 B2
(45) Date of Patent: Dec. 27, 2011

(54) WIRELESS INTRUSION PREVENTION SYSTEM AND METHOD

(75) Inventors: Guoning Hu, Freemont, CA (US); Deepak Venugopal, Irving, TX (US); Shantanu Bhardwaj, Los Angeles, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 871 days.

(21) Appl. No.: 11/946,003

(22) Filed: Nov. 27, 2007

(65) Prior Publication Data
US 2008/0178294 A1 Jul. 24, 2008

Related U.S. Application Data

(60) Provisional application No. 60/867,297, filed on Nov. 27, 2006.

(51) Int. Cl.
*G06F 11/00* (2006.01)
*G06F 12/14* (2006.01)
*G06F 12/16* (2006.01)
*G08B 23/00* (2006.01)
*H04B 17/00* (2006.01)
*H04B 7/00* (2006.01)
*H04M 1/66* (2006.01)
*H04M 1/68* (2006.01)
*H04M 3/16* (2006.01)

(52) U.S. Cl. ......... 726/24; 726/23; 455/67.11; 455/411; 455/522

(58) Field of Classification Search .......... None
See application file for complete search history.

(56) References Cited

U.S. PATENT DOCUMENTS

| | | | |
|---|---|---|---|
| 6,993,660 B1 | 1/2006 | Libenzi et al. | |
| 7,062,553 B2 | 6/2006 | Liang | |
| 7,287,281 B1 | 10/2007 | Szor | |
| 7,331,061 B1 | 2/2008 | Ramsey et al. | |
| 7,426,383 B2 * | 9/2008 | Wang et al. | 455/411 |
| 7,515,926 B2 * | 4/2009 | Bu et al. | 455/522 |
| 7,702,806 B2 | 4/2010 | Gil et al. | |
| 7,748,038 B2 | 6/2010 | Olivier et al. | |
| 7,778,606 B2 * | 8/2010 | Ammon et al. | 455/67.11 |
| 2002/0116639 A1 | 8/2002 | Chefalas et al. | |
| 2003/0027551 A1 * | 2/2003 | Rockwell | 455/410 |
| 2003/0084321 A1 * | 5/2003 | Tarquini et al. | 713/200 |
| 2004/0028016 A1 * | 2/2004 | Billhartz | 370/338 |
| 2004/0235455 A1 | 11/2004 | Jiang | |
| 2005/0037733 A1 * | 2/2005 | Coleman et al. | 455/411 |
| 2005/0172337 A1 | 8/2005 | Bodorin et al. | |
| 2005/0198051 A1 | 9/2005 | Marr et al. | |
| 2006/0150250 A1 * | 7/2006 | Lee et al. | 726/23 |
| 2006/0203736 A1 | 9/2006 | Molen et al. | |
| 2006/0253703 A1 | 11/2006 | Eronen et al. | |
| 2006/0276173 A1 | 12/2006 | Srey et al. | |
| 2007/0089172 A1 | 4/2007 | Bare et al. | |

(Continued)

FOREIGN PATENT DOCUMENTS
WO 2005001733 A1 1/2005

*Primary Examiner* — Shin-Hon Chen
(74) *Attorney, Agent, or Firm* — Shumaker & Sieffert, P.A.

(57) ABSTRACT

A wireless intrusion prevention system and method to prevent, detect, and stop malware attacks is presented. The wireless intrusion prevention system monitors network communications for events characteristic of a malware attack, correlates a plurality of events to detect a malware attack, and performs mitigating actions to stop the malware attack.

11 Claims, 3 Drawing Sheets

U.S. PATENT DOCUMENTS

| | | |
|---|---|---|
| 2007/0118759 A1 | 5/2007 | Sheppard |
| 2007/0217371 A1* | 9/2007 | Sinha ........................... 370/338 |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0291945 A1* | 12/2007 | Chuang et al. ................ 380/270 |
| 2008/0086773 A1 | 4/2008 | Tuvell et al. |
| 2008/0086776 A1 | 4/2008 | Tuvell et al. |
| 2008/0096526 A1* | 4/2008 | Miettinen et al. ............. 455/411 |

* cited by examiner

WIRELESS INTRUSION PREVENTION SYSTEM AND METHOD

CROSS-REFERENCE TO RELATED APPLICATIONS

This application claims the benefit of U.S. Provisional Application Ser. No. 60/867,297 entitled, "Wireless Intrusion Prevention System and Method", filed on Nov. 27, 2006.

FIELD OF THE INVENTION

The present invention is related generally to a system and method for detecting, preventing, and stopping malware attacks on wireless networks.

BACKGROUND OF THE INVENTION

Mobile devices are potential targets for hackers and malware writers. As users increase the number of data applications on their mobile devices, the risk of malware being introduced into the mobile network and spread among mobile devices also increases. Malware tends to spread exponentially in a network, therefore it is important to stop malware early to prevent service disruption in significant portions of the network.

Typical malware detection applications scan a single computer to determine whether the computer is infected with malware and remove the offending malware when a malware signature is detected in a compromised application. Although post-infection cleaning can remove malware from a single computer, such cleaning is only effective for malware that has already been identified and recognized. Post-infection cleaning is not capable of removing new or changing malware, and cannot prevent the infection from occurring.

Network techniques to prevent the spread of malware involve scanning network traffic for a malware signature at distinct points, called firewalls, to prevent malware from entering the network. However, this technique does not protect the network from malware that enters the network from points within the network itself. More robust network techniques involve placing a scanner within network elements, such as one or more of the routers that make up the data network. However, both of these network techniques are effective only for malware that has already been identified and recognized, not new or changing malware. Furthermore, such network techniques do not stop infections from happening in the first place.

Accordingly, there is a need for a system and method that can identify both new and old malware in the wireless network and prevent it from spreading to mobile phones. There is a need for a system that can detect, prevent, and stop malware attacks on wireless networks before the malware has a chance to spread and significantly disrupt service in a network.

SUMMARY OF THE INVENTION

The system and method for wireless intrusion prevention use information gathered within the entire mobile network to prevent, detect, and stop malicious attacks on a mobile network and assist in mitigating the spread of the malware. The system is especially effective with respect to specific types of attacks, namely mobile worm attacks, battery draining attacks, and Denial of Service (DoS) attacks. However, the system and method are also applicable to other types of malware attacks and is therefore an important security component of an operator's mobile network. In an embodiment, the system includes three types of components: monitors, intelligent agents, and security centers. The system components operate on both network elements and mobile devices or handsets in mitigating malware attacks.

BRIEF DESCRIPTION OF THE FIGURES

The accompanying figures depict multiple embodiments of the system and method for detecting, preventing, and stopping malware attacks on wireless networks. A brief description of each figure is provided below. Elements with the same reference numbers in each figure indicate identical or functionally similar elements. Additionally, the left-most digit(s) of a reference number identifies the drawings in which the reference number first appears.

DETAILED DESCRIPTION

It should be noted that the invention is not limited in its application or use to the details of construction and arrangement of parts illustrated in the accompanying drawings and description. The illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention. In addition, as used herein, the term "exemplary" indicates a sample or example. It is not indicative of preference over other aspects or embodiments.

Figure 1:
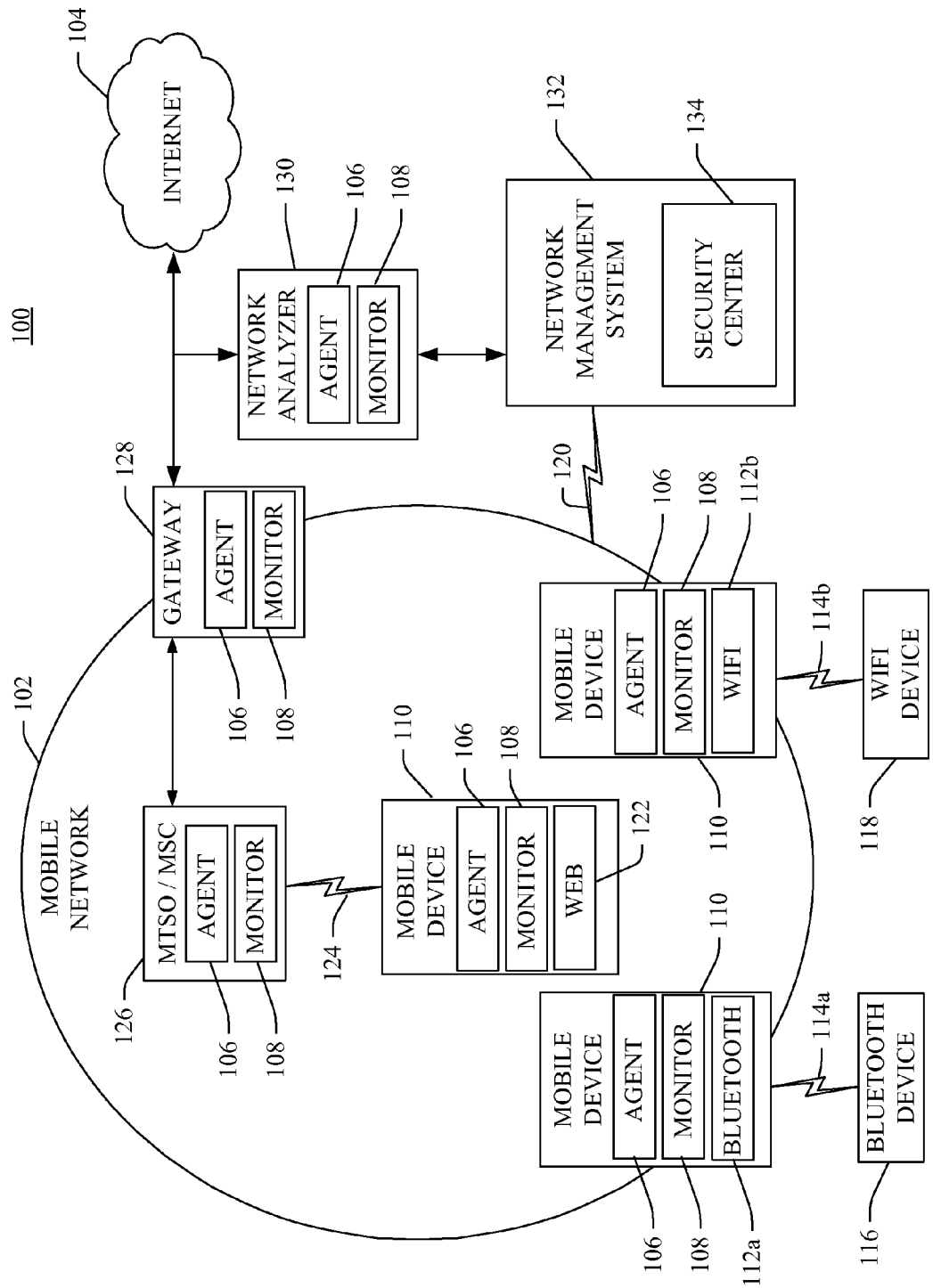
FIG. 1 depicts a block diagram of an exemplary deployment of monitors, agents, and a security center in accordance with an aspect of the subject matter described herein

Referring now to FIG. 1, in an embodiment, the wireless intrusion prevention system 100 comprises monitors 108, intelligent agents 106, and at least one security center 134. Each monitor 108 is associated with a network device 110, 126, 128, 130. Each monitor 108 is in communication with one or more intelligent agents 106 that communicate with the security center 134 portion of a network management system 132. Communications with the security center 134 are generally performed via wireless communication 120.

Network devices 110, 126, 128, 130 include mobile devices 110 or mobile devices 110, network elements 126, 128 that serve as infrastructure components of the mobile network 102, or network analyzers 130 used to independently monitor communications in the network. The term network element 126, 128 can be used interchangeably with the term network component 126, 128, and can also include the network analyzers 130 in some contexts. The term mobile device 110 and handset 110 can also be used interchangeably, although mobile device 110 is generally used to encompass a wider array of wireless enabled devices, including but not limited to PDAs and laptop computers.

The mobile devices 110 may have wireless interfaces 112*a*, 112*b* such as a Bluetooth interface 112*a* for communicating via Bluetooth 114a with another Bluetooth-equipped device 116, or an 802.11x or Wi-Fi interface 112b for communicating via Wi-Fi 114b with another Wi-Fi-equipped device 118. Internet enabled mobile devices 110 typically have network applications 122 such as a browser or web interface enabling them to send and receive data 124 from the Internet 104.

The Monitor

Continuing to refer to FIG. 1, a monitor 108 is a component associated with a network device 110, 126, 128, 130 in the mobile network 102. As used herein, the term component includes hardware, software, firmware, or any combination thereof. The device 110, 126, 128, 130 might be a mobile device 110 or a network element 126, 128, 130 in the mobile network 102. The monitor 108 is communicatively connected to one or multiple intelligent agents 106. The monitor 108 is capable of performing the following functions:

- scanning the incoming and outgoing packets to detect malicious content or malware using heuristic rules;
- reporting detected malware to intelligent agents 106;
- recording the activity of the network device 110, 126, 128, 130; and
- reporting the network device 110, 126, 128, 130 activities upon requests from intelligent agents 106.

By inspecting the incoming and outgoing data from a device 110, 126, 128, 130, monitors 108 acquire a significant amount of data. Some of the data may be duplicative with that collected by other monitors 108. Scanning and reporting the same content from multiple devices 110, 126, 128, 130 uses considerable network resources. However, such duplication increases the robustness of the wireless intrusion prevention system 100 since some attacks involve hiding or modifying of certain data. Also, some data is related to sensitive, private contents and is not monitored. Therefore, the client side (mobile device 110 side) monitors 108 and the network side monitors 108 may scan incoming and outgoing data differently.

For examples, monitors 108 on the client side may scan by performing any or all of the following functions:

- scanning the incoming and/or outgoing packets or files (data 124) from the network application 122, Wi-Fi connection 112b, or a Bluetooth connection 112a, where such scanning may be a deep scan, and include careful examination of individual contents using malware signatures and heuristic rules capable of identifying malicious programs or data;
- recording the time, the source (incoming packets) and destination (outgoing packets) address, and the size of the packets, where the format of the recorded data can be made consistent with the format used in the network 102 side monitoring; and
- monitoring and recording other activities upon requests from intelligent agents 106.

Some representative malware scanning algorithms for mobile devices 110 include, but are not limited to, malware signature searches; hash signature searches as described in U.S. patent application Ser. No. 11/697,647 "Malware Detection System and Method for Mobile Platforms"; malware detection in headers and compressed parts of mobile messages as described in U.S. patent application Ser. No. 11/697,658 "Malware Detection System and Method for Compressed Data on Mobile Platforms"; malware modeling as described in U.S. patent application Ser. No. 11/697,642 "Malware Modeling Detection System and Method for Mobile Platforms"; malware modeling for limited access devices as described in U.S. patent application Ser. No. 11/697,664 "Malware Modeling Detection System and Method for Mobile Platforms"; and non-signature detection methods as described in U.S. patent application Ser. No. 11/697,668 "Non-Signature Malware Detection System and Method for Mobile Platforms".

Monitors 108 examine or scan communications among the elements of the mobile network 102, including mobile devices 110. In an embodiment, the monitors 108 on the network 102 side use the sFlow monitoring specifications (see RFC 3176, available online at www.ietf.org/rfc/rfc3176.txt and herein incorporated by reference) thereby gathering considerable envelope and routing information and relatively little or no content information. When scanning of content is permitted, representative malware algorithms for scanning on the network 102 side include, but are not limited to, malware signature searches; hash signature searches as described in U.S. patent application Ser. No. 11/697,647 "Malware Detection System and Method for Mobile Platforms"; and malware detection in headers and compressed parts of mobile messages as described in U.S. patent application Ser. No. 11/697,658 "Malware Detection System and Method for Compressed Data on Mobile Platforms".

The Intelligent Agent

An intelligent agent 106 receives information from one or several monitors 108. Intelligent agents 106 can be located in both the mobile device 110 and the network 102. In one embodiment, an intelligent agent 106 on a mobile device 110 is associated with a monitor 108 in the mobile device 110. In another embodiment, an intelligent agent 106 on the network 102 is associated with multiple monitors 108 in distributed locations, for example in different cities. An intelligent agent 106 communicatively connects to the security center 134. In alternative embodiments, an intelligent agent 106 is communicatively connected to other intelligent agents 106. In another embodiment, the functions of an intelligent agent 106 include:

- analyzing the information from monitors 108 to build up user, device, and network 102 activity profiles;
- detecting unusual mobile device 110 activities or network connections;
- reporting mobile device 110 activities to the security center 134 or other intelligent agents 108 upon request;
- reporting detected malicious attacks or malware to the security center 134;
- reporting suspicious activities or programs to the security center 134 and requiring appropriate security actions;
- cleaning or blocking detected malicious programs or data; and,
- receiving updates from the security center 134 and informing the associated monitors 108.

An intelligent agent 106 analyzes events reported from associated monitors 108 to determine if the events correlate to a characteristic of a malware attack. For example, an intelligent agent 106 reports a possible malicious attack if one or more mobile devices 110 receive multiple identical packets, a characteristic of a denial of service attack.

In an alternative embodiment, the functions of the intelligent agent 106 are performed by the security center 134.

The Security Center

Security centers 134 are portions of network management systems 132 that monitor network 102 activities and control network 102 security with a comprehensive set of security tools. Security centers 134 receive information from intelligent agents 106 in both mobile devices 110 and from network elements 126, 128, 130 in the network 102. One responsibility of each security center 134 is to integrate and analyze the information from distributed monitors 108 in the network 102, e.g., information from both the network 102 traffic and mobile devices 110, and use this information to protect the network 102 against any malicious attack. In one embodiment, the security centers 134 have a hierarchical architecture, e.g., one local security center 134 is responsible for a particular portion of the radio network, and reports up to one or more global security centers 134. In this embodiment, a local security center 134 performs the following actions:

- integrate received information to build a profile for the activity of the locally monitored network 102;
- detect malicious attacks and malware, including distinguishing normal network 102 activities from abnormal activities based on activity profile;
- send security warnings, instructions, or updates to intelligent agents 106;
- generate security alarm to one or more of the global security centers 134; and
- provide a user interference that allows human experts to monitor the network 102 activity, analyze suspicious programs, and verify security alarms.

In this embodiment, the global security center 134 is responsible for:

- coordinating local security centers 134, integrating information from them and building a profile for the activity of the entire network 102;
- detecting malicious attacks and malware that are missed by all the local security centers 134;
- analyzing the detected malicious attacks and malware to determine the appropriate security actions or solutions and generating updates for local security centers 134 and intelligent agents 106; and
- broadcasting security alarms and updates to local security centers 134.

In an alternate embodiment, the security centers 134 have a flat architecture with overlapping regions of responsibility. The responsibilities of security centers 134 in a flat architecture can be distributed among different servers as is commonly known in the art of distributed systems.

In an alternative embodiment, the functions of the security center 134 are performed by the intelligent agent 106. In an alternative embodiment, either or both the security center 134 and the intelligent agent 106 can be a mitigation agent triggering the mitigation actions to be performed on the network.

Example Applications of the Wireless Intrusion Prevention System

The wireless intrusion prevention system 100 is capable of identifying and neutralizing multiple types of malicious attacks on the mobile network 102. Examples listed below are meant to be illustrative and not to constrain the method and system to any specific embodiment.

Figure 2:
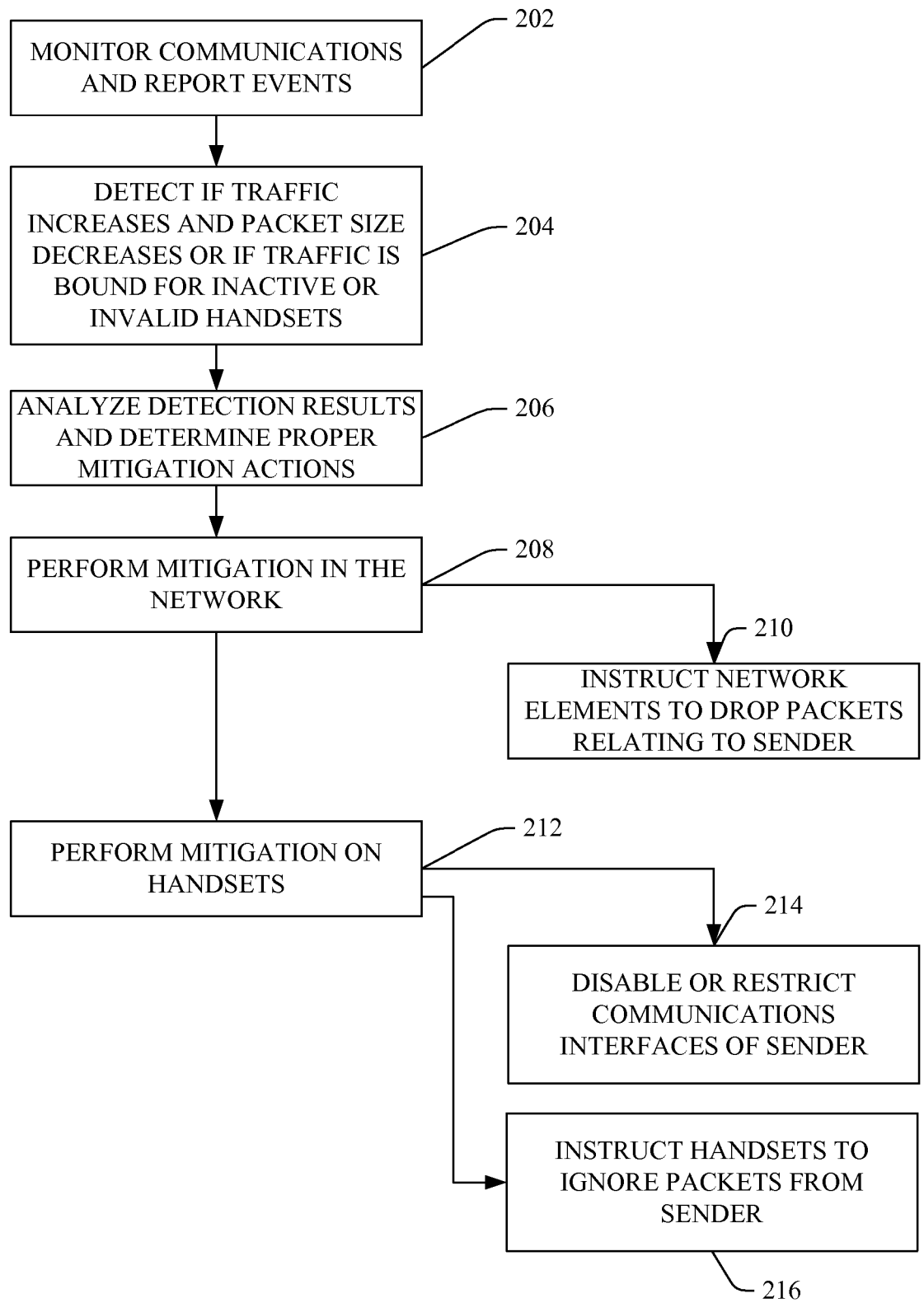
FIG. 2 is flowchart illustrating an exemplary method for monitoring, detecting, and mitigating malicious communications in a mobile network in accordance with an aspect of the subject matter described herein.

Referring now to the flowchart of FIG. 2, a monitor 108 in a mobile device 110 or network element monitors 202 communications in the network 102 for identifying events characteristic of malicious communications to report to an intelligent agent 106. A battery draining malware typically involves port scanning a mobile device from another site using a spoofed address. Therefore battery draining malware may result in a suspicious increase of local network traffic, e.g., increasing network traffic with decreasing average packet sizes, or increased distributed communication among mobile devices. An intelligent agent or security center detects 204 the battery draining malware attack based upon an analysis or correlation of network activity. In an embodiment, an agent 106 or security center 134 detects attack based upon the dynamics of network 102 activity when compared to the normal profiles of the network 102 activity. In another embodiment, the intelligent agent 106 or security center 134 compares activity levels to one or more predetermined thresholds. Such thresholds can be based upon historic data regarding network 102 activity. In yet another embodiment, normal activity can be determined based upon averages of historic network activity. Alternatively, the agent 106 or security center 134 can analyze the variation or percentage of change in network 102 activity over a specific time period to detect attacks.

In another embodiment, an intelligent agent 106 detects 204 the battery draining malware attack by noting a packet sent to an invalid handset address. In an embodiment, a monitor on a trap handset 110, also called a honeypot, that does not have any normal active communication by itself monitors 202 any packets directed to the trap handset 110 and reports the suspect activity. Similarly, an intelligent agent 106 or security center 134 detects 204 traffic directed towards mobile devices 110 that seldom have communications. Intelligent agents 106 report the detection to a security center 134 which analyzes 206 the results and determines whether a battery draining malware attack is occurring.

Once a battery draining malware attack is detected, intelligent agents in network elements perform appropriate actions to mitigate 208 the battery draining malware attack in the network. For example, on the network 102 side, intelligent agents 106 instruct 210 the network 102 to drop packets associated with the attack or provide information to the security system 134 of the network 102 operator. On the client side intelligent agents mitigate 212 the battery draining malware attack on the associated handsets. In an embodiment, intelligent agents instruct 216 mobile devices to ignore or filter the packets associated with the attack. If a mobile device 110 sending malicious communications is inside the service provider's network 102, intelligent agents 106 disable 216 outbound communications on that mobile device 110, or restrict 216 communications to stop the malicious activity without completely disabling the communications interfaces. For example, communications could be limited to allowing the mobile device 110 to reach network addresses associated with a service center 134 in order to download antivirus software.

Another kind of attack, a DoS attack, is designed to overwhelm the network and quickly consume its resources. DoS attacks are identified 204 in a similar manner as a battery draining malware by detecting 204 a significant increase of activities associated with a network device 110, 126, 128, 130 or communications with invalid or inactive mobile devices 110. For example, under a DoS attack, the profile will show the an increase in volume of network traffic within a short time interval. This activity would indicate the likelihood of a DoS attack. Once a possible DoS attack is identified, the security center 134 can analyze 206 the detection results and determine 206 whether or not an attack is actually occurring by taking certain actions, e.g., intercepting the network traffic, and/or sending responses to the suspect source IP addresses and requiring feedback.

The DoS attack can be mitigated in a similar manner as a battery draining malware attack. In addition, a DoS attack can also be stopped by identifying the malicious sender. For this, IP traceback techniques can be adapted to detect spoofed addresses. Once the sender is identified, corresponding intelligent agents 106 instruct 210 the network to drop the packets associated with the attack. If the sender of the malicious communications is within the service provider's network 102, intelligent agents 106 disable 216 outbound communications on that mobile device, or restrict 216 communications to stop the malicious activity.

Figure 3:
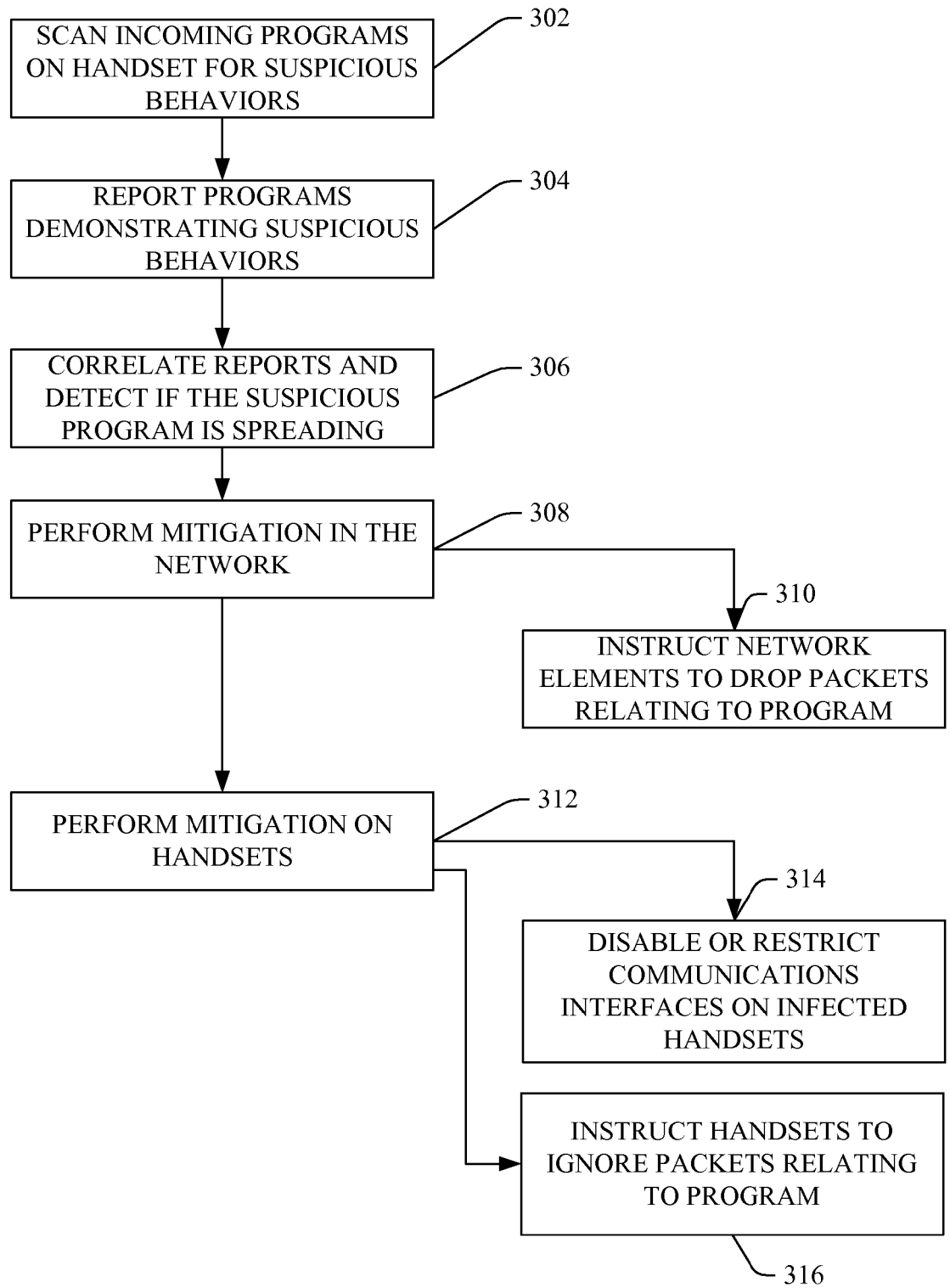
FIG. 3 is flowchart illustrating an exemplary method for monitoring, detecting, and mitigating malware in a mobile network in accordance with an aspect of the subject matter described herein.

Referring now to the flowchart of FIG. 3, a monitor in a mobile device scans 302 incoming programs on the mobile device for identifying characteristics of malware to report 304 to an intelligent agent. Many existing worms can be detected by pre-defined signatures. However, worms that change as they spread or new worms whose signatures are not yet included in antivirus databases cannot be identified based upon signature. Therefore, in addition to the signature-based detection, the monitors, intelligent agents, and security centers cooperate to detect and identify mobile worm malware using heuristic rules that describe suspicious behaviors of worms, e.g., upon infecting one device malicious worms propagate to a different device using standard spreading mechanisms such as Bluetooth or MMS.

On the client side, a monitor in a mobile device scans 302 incoming programs. Once the monitor detects suspicious behaviors in incoming programs, the monitor 108 marks the program as suspicious and reports 304 the suspect program to the security center. The security center correlates 306 reports from distributed monitors. If a suspicious program is detected from many distributed monitors 108, the security center concludes that the corresponding program is a spreading worm, performs 308 mitigating actions in the network 102 and instructs intelligent agents 106 to perform 312 mitigating actions in the mobile devices 110.

In an embodiment, on the network side, intelligent agents 106 instruct 310 the network 102 to drop or delete the packets associated with the suspect program and provide information to the security system 134 of the network 102 operator. In another embodiment, on the client side, intelligent agents 106 instruct 316 mobile devices to ignore or filter the packets associated with the suspect program. If a mobile device 110 sending the suspect program is inside the service provider's network 102, intelligent agents disables 316 outbound communications on that mobile device. In another embodiment, the intelligent agent 106 restricts 316 communications to stop the spread of the suspect program without completely disabling the communications interfaces.

In another embodiment, the service center also instructs other network level security centers to take action to prevent the work from spreading. The suspicious program is also analyzed in the security centers by experts to determine whether or not the suspect program is truly malicious, and if it is not malicious the security center can reverse the protective measures taken by the intelligent agents.

CONCLUSION

The embodiments of the invention shown in the drawings and described above are exemplary of numerous embodiments that may be made within the scope of the appended claims. It is contemplated that numerous other configurations of the disclosed system and method for detecting, preventing, and stopping malware attacks on wireless networks may be created taking advantage of the disclosed approach. It is the applicant's intention that the scope of the patent issuing herefrom will be limited only by the scope of the appended claims.

What is claimed is:

1. A malware detection and mitigation system, comprising:
 a plurality of mobile devices configured to execute a respective plurality of monitors operably adapted to scan network communications to determine destinations of the network communications, amounts of network traffic including one or more of the network communications to the destinations over time intervals, and average packet size of the network communications;
 a plurality of detection agents each executing on a respective one of the mobile devices and operably adapted to communicate with at least one of the plurality of monitors of the respective one of the plurality of mobile devices, to determine normal amounts of network traffic over the time intervals to the destinations, to determine normal average packet size of the network communications to the destinations, to detect changes in the amounts of network traffic over the time intervals to a particular destination relative to the determined normal amount of network traffic to the particular destination over the time intervals, to detect changes in the average packet size of the network communications to the particular destination relative to the determined normal average packet size of the network communications to the particular detection, to detect a malware attack based on at least one of detected changes in the amount of network traffic over the time intervals, detected changes in the average packet size, and the destinations of the network communications, and to communicate an attack indication when the malware attack is detected; and
 a network device separate from the one of the plurality of mobile devices, wherein the network device comprises a mitigating agent operably adapted to communicate with the plurality of detection agents via a mobile network to receive the attack indication and to trigger a mitigating action in response in the mobile network to the attack indication.

2. The malware detection and mitigation system of claim 1, wherein the mitigating action comprises at least one mitigating action directed to the one of the plurality of mobile devices and at least one mitigating action directed to a network element.

3. The malware detection and mitigation system of claim 1, wherein the network communications are wireless network communications.

4. The malware detection and mitigation system of claim 1, wherein the malware attack is selected from the group consisting of a battery draining malware attack, a denial of service malware attack, and a mobile worm malware attack.

5. The malware detection and mitigation system of claim 1, wherein the plurality of detection agents are configured to detect changes in the amount of the network traffic over the time intervals and changes in the average packet size of the communications that are correlated with a characteristic of the malware attack, the characteristic selected from the group consisting of an increase in network traffic to the particular destination and an increase in network traffic to the particular destination and a decrease in the average packet size of the network communications to the particular destination.

6. The malware detection and mitigation system of claim 1, further comprising one or more network elements configured to execute respective ones of a second plurality of monitors.

7. The malware detection and mitigation system of claim 6, wherein the one or more network elements are each selected from the group consisting of a handset, a mobile device, a gateway, a traffic sniffer, a honeypot, a router, a switch, and a register.

8. The malware detection and mitigation system of claim 1, wherein the mitigating action is selected from the group consisting of reporting the malware attack, disabling the network communications, restricting the network communications, ignoring the network communications, performing a malware scan, and intercepting the network communications and forwarding to the security center.

9. The malware detection and mitigation system of claim 1, wherein the plurality of detection agents are configured to detect the malware attack in response to detecting a packet bound for an inactive mobile device.

10. The malware detection and mitigation system of claim 1, wherein the plurality of detection agents are further configured to detect a malware attack in response to detecting a program sent to a plurality of mobile devices.

11. The malware detection and mitigation system of claim 1, wherein the monitors are further configured to determine senders of the network communications, wherein the detection agents are configured to determine an identity of a sender associated with the malware attack and to provide information indicative of the identity of a sender in the attack indication, and wherein the mitigating agent of the network device is configured to instruct the mobile devices to drop packets from the sender associated with the malware attack.

* * * * *